2,531,292

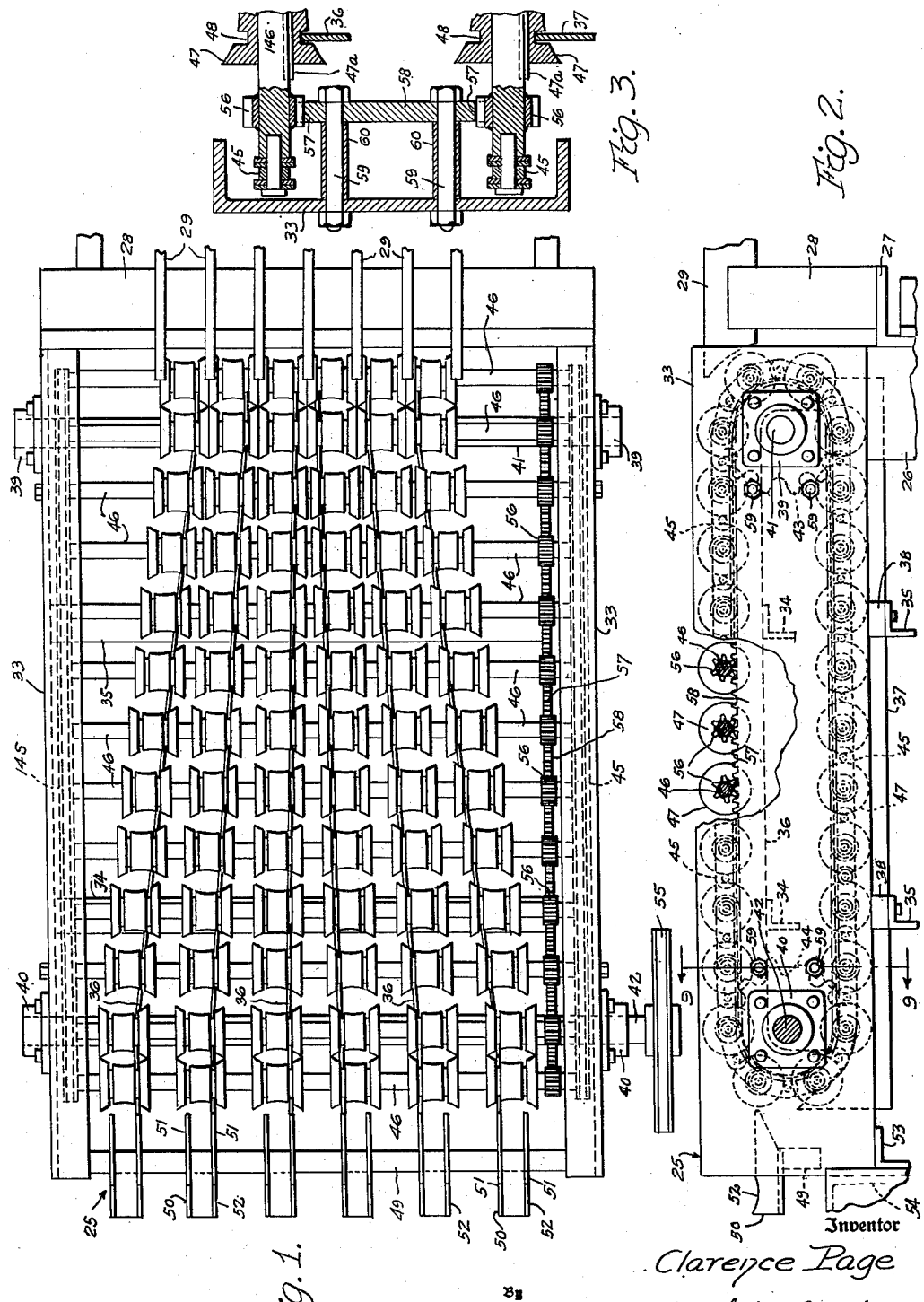
Nov. 21, 1950 — C. PAGE — 2,531,292
EGG REARRANGING AND FEEDING DEVICE
Original Filed Aug. 29, 1947
Inventor
Clarence Page
Barthel + Bugbee
Attorneys Patented Nov. 21, 1950

UNITED STATES PATENT OFFICE 2,531,292

EGG REARRANGING AND FEEDING DEVICE

Clarence Page, Detroit, Mich., assignor to Page and Cox, Detroit, Mich., a corporation of Michigan Original application August 29, 1947, Serial No. 771,227. Divided and this application October 19, 1948, Serial No. 55,338

4 Claims. (Cl. 198—30)

This invention relates to machines for grading articles according to their weight and, in particular, to egg-grading machines.

One object of this invention is to provide an egg-rearranging and feeding device which separates from one another the eggs delivered to it, rotates them positively and forcibly while conveying them along separate paths and turns them until their long axes are horizontal, thereby separating the eggs into laterally spaced rows with all the eggs lying in horizontal positions.

Another object is to provide an egg-rearranging and feeding device as set forth in the preceding object, wherein the eggs while being conveyed are carried along diverging paths and deposited upon laterally spaced supports from which they may be picked up and carried to further egg-processing stations.

Another object is to provide an egg-rearranging and feeding device, as set forth in the preceding objects, wherein the eggs are forcibly rotated by mechanism which operates in response to the travel of the eggs themselves as they are conveyed through the machine.

This application is a division of my co-pending application Serial No. 771,227, filed August 29, 1947, for Adjustable Range Egg-Sorting Machine, which is itself a continuation-in-part of my co-pending application Serial No. 718,755 filed December 27, 1946, for Egg-Grading Machine, which on September 6, 1949, matured into U. S. Patent No. 2,481,440.

In the drawings:

Figure 1 is a top plan view of an egg-rearranging and feeding device according to a preferred form of the invention;

Figure 2 is a side elevation of the egg-rearranging and feeding device shown in Figure 1, partly broken away to disclose the positive driving mechanism for the egg rotating and conveying shafts; and Figure 3 is a fragmentary vertical section taken along the line 3—3 in Figure 2.

In said co-pending application Serial No. 718,755, I have disclosed a device which receives eggs from the containers and conveys the eggs along diverging pathways while permitting them to rotate until they are rearranged with their long axes horizontal and deposited upon laterally spaced rests or supports while remaining in their horizontal positions.

Experience with the egg-feeding unit 40 as disclosed in said co-pending application Serial No. 718,755 has proved that the spools thereof upon which the eggs are rotated while being fed tend to stick as a result of clogging by dirt or other foreign matter. To eliminate this difficulty, the modified egg-feeding unit 25 shown in Figures 1 to 3 inclusive has been provided. The egg-feeding unit 25 is mounted upon legs 26 which are interconnected by an angle member 27 (Figure 2). Supported by the angle member 27 is a cross member 28 which in turn supports horizontal stripping fingers 29 which strip the bottoms or flats from the fillers or egg-containers in which the eggs are received. The action of these stripping fingers 29 has been described in my co-pending application Serial No. 718,755 previously mentioned.

The egg-feeding unit 25 (Figures 1 and 2) includes a frame formed by a pair of vertical channel members 33 mounted on the upper ends of the legs 26 with their channel portions facing one another. The channel members 33 are interconnected at intervals by upper and lower angle members 34 and 35 which in turn support upper and lower diverging guide rails 36 and 37 respectively (Figure 3). The lower flanges of the channel members 33 are separated from the lower angle members 35 by spacing members 38.

Bolted to the channel members 33 at their forward and rearward ends are pairs of aligned bearing bushings 39 and 40 respectively, in which are journaled cross shafts 41 and 42 respectively. The shafts 41 and 42 carry sprockets 43 and 44 respectively, these being encircled by endless chains 45. The endless chains 45 at intervals are interconnected by rods 46 carrying capstan-shaped rollers or spools 47. The spools 47 are keyed or splined to the rods 46 as at 47a (Figure 3) so as to be positively driven by the rods 46 while being slidable axially therealong. The spools 47 near their opposite ends are provided with annular grooves 48 engageable with the guide rails 36 or 37.

A cross member 49 extends between the left-hand end of the channel members 33 (Figure 1) and serves to support egg rests 50. The egg rests 50 consist of pairs of thin parallel bars 51 separated by gaps less than the small diameter of an undersized egg and having arcuate cutaway portions 52 on their upper edges. The right-hand ends of the bars 52 are positioned approximately in line with the grooves 48 of the spools 47. The channel members 33 at their left-hand ends rest upon an angle member 53 which in turn is secured to an angle member 54 mounted on legs.

In order to drive the sprocket chain 45, the shaft 42 carries an outer sprocket 55 upon the outer end thereof (Figure 1) this being driven by a sprocket chain (not shown) connected to the driving mechanism for the remainder of the egg-sorting machine in a manner fully disclosed in my previously-mentioned co-pending application Serial No. 718,755. In order to positively rotate the spools 47 upon their shafts 46, each of the latter is provided at one end with a pinion 56 (Figures 1 and 3) which meshes with the teeth 57 of an orbital or elongated endless rack 58 (Figure 2). The rack 58 is secured by bolts 59 and tubular spacers 60 to one of the channel members 33 (Figure 3) so as to be accurately held in position.

In the operation of the modified egg-feeding unit 25 shown in Figures 1 to 3 inclusive, let it be assumed that the cardboard fillers or egg-containers have been slid along the fingers 29 and that their bottoms have been removed by the latter. As the fillers are slid beyond the left-hand ends of the fingers 29, the eggs therein drop upon the spools 147 and come to rest between spools. Meanwhile, the rotation of the sprocket 55 and the consequent rotation of the sprockets 43 and 44 drives the sprocket chains 45 in an orbital path, carrying with them the rods 46. As these move along, the pinions 56 roll upon the teeth 57 of the orbital rack 58, causing the rods 46 and their spools 47 to be forcibly and positively rotated. In this manner, the spools 47 are prevented from sticking or binding, as occasionally occurs with free rotatable spools. The eggs are thus forcibly rotated as they are advanced to the left, causing them to reach the egg rests 50 with their long axes approximately horizontal.

As the spools 47 and their rods 46 travel toward the left (Figure 1), the guide rails 36 engage the spool grooves 48 and cause the eggs to be separated into spaced rows, the eggs of each row finally coming to rest with their long axes horizontal in the arcuate cutaway portions 52 of the egg rests 50.

What I claim is:

1. An egg-rearranging and feeding device comprising a pair of spaced endless flexible members having shafts extending therebetween and connected thereto, a plurality of axially concave rollers drivingly mounted on each of said shafts, the length of the free portion of each shaft between said members being substantially greater than the combined lengths of the rollers mounted on each shaft, said rollers being freely slidable axially along their respective shafts, and mechanism for positively rotating said shafts in response to the travel of said endless flexible members.

2. An egg-rearranging and feeding device comprising a pair of spaced endless flexible members having shafts extending therebetween and connected thereto, a plurality of axially concave rollers drivingly mounted on each of said shafts, the length of the free portion of each shaft between said members being substantially greater than the combined lengths of the rollers mounted on each shaft, said rollers being freely slidable axially along their respective shafts, mechanism for positively rotating said shafts in response to the travel of said endless flexible members, said rollers having annular grooves therein, and diverging guides engaging said grooves to effect divergence of said rollers in the direction of travel of said endless flexible members.

3. An egg-rearranging and feeding device comprising a pair of spaced endless flexible members having shafts extending therebetween and connected thereto, a plurality of axially concave rollers drivingly mounted on each of said shafts, the length of the free portion of each shaft between said members being substantially greater than the combined lengths of the rollers mounted on each shaft, said rollers being freely slidable axially along their respective shafts, and mechanism including pinions drivingly mounted on said shafts and a rack meshing with said pinions for positively rotating said shafts in response to the travel of said endless flexible members.

4. An egg-rearranging and feeding device comprising a pair of spaced endless flexible members having shafts extending therebetween and connected thereto, a plurality of axially concave rollers drivingly mounted on each of said shafts, the length of the free portion of each shaft between said members being substantially greater than the combined lengths of the rollers mounted on each shaft, said rollers being freely slidable axially along their respective shafts, and mechanism including pinions drivingly mounted on said shafts and an endless orbital rack meshing with said pinions for positively rotating said shafts in response to the travel of said endless flexible members.

CLARENCE PAGE.

REFERENCES CITED

The following references are of record in the file of this patent:

UNITED STATES PATENTS

| Number | Name | Date |
|---|---|---|
| 626,284 | Lyons et al. | June 6, 1899 |
| 878,671 | Richmond | Feb. 11, 1908 |
| 1,439,698 | Erdle | Dec. 26, 1922 |